Feb. 15, 1944.  W. WALKER  2,341,673
TRANSPARENT MEMBER
Filed Jan. 17, 1940
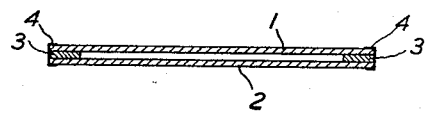
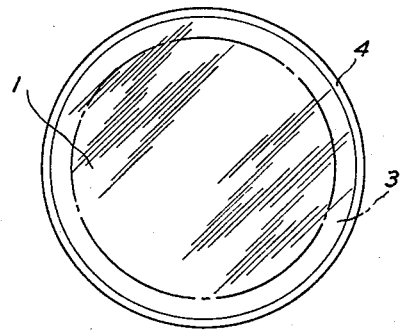
WILLIAM WALKER
INVENTOR
ATTORNEYS Patented Feb. 15, 1944

2,341,673

UNITED STATES PATENT OFFICE 2,341,673

TRANSPARENT MEMBER

William Walker, London, England, assignor to Celanese Corporation of America, a corporation of Delaware Application January 17, 1940, Serial No. 314,351
In Great Britain January 21, 1939

4 Claims. (Cl. 2—14)

This invention relates to transparent window closures such, for example, as respirator eye-pieces and observation panels in land or air vehicles and gun turrets, which in use are likely to be subjected on one side to an atmosphere differing in humidity and/or temperature from the atmosphere to which the other side is exposed.

I have found that it is of advantage to construct such transparent window closures from two sheets of transparent material, at least one of said sheets being of cellulose acetate or other transparent thermoplastic organic material, the other being of the same material or of glass or other transparent material which is of greater heat-resistance than the thermoplastic material, the two being united by means of an annulus of thermoplastic material. Union may be effected by means of a suitable cement or solvent liquid and/or by taking advantage of the thermoplastic nature of the materials employed and uniting them under the influence of heat and pressure.

Respirator eye-pieces and like transparent window closures made according to the invention are more resistant than simple eye-pieces to dimming owing to the condensation of moisture thereon when the eye-piece or the like is subjected on different sides to atmospheres differing in humidity and/or temperature. Moreover, when, as in one form of the invention a respirator eye-piece comprises a disc of glass or other transparent non-thermoplastic material and a disc of thermoplastic material united by the annulus, and the eye-piece is fitted into the respirator with the glass on the outside, better protection against fire is given to the wearer than with a simple eye-piece of the thermoplastic material and there is at the same time greater protection against damage to the eye from breakage of the glass than in the case of simple glass eye-pieces. Thus, eye-pieces of this kind are of special utility in firemen's respirators. The eye-pieces and the like of the invention have the further advantage of being very simply and cheaply constructed.

A respirator eye-piece according to the invention is shown by way of example in the accompanying drawing, wherein Fig. 1 is a sectional elevation, and Fig. 2 is a plan view.

Referring to the drawing, the disc 1 which is of glass is united to the disc 2 which is of cellulose acetate or like organic thermoplastic film-forming material by the annulus 3 to which both discs are adherent. The edge of the composite disc is sealed against entry of air between the components by a layer 4 of gold size or other suitable sealing composition. For the sake of clarity a clear line of demarcation is shown between adjacent surfaces of the disc 2 and the annulus 3. Actually, however, these are welded by the heat and pressure applied into a homogeneous whole. In use the eye-piece will be assembled in the respirator face-piece with the glass disc 1 on the outside.

Instead of glass the outer disc 1 can be made of thermoplastic material such as that of which the annulus 3 and inner disc 2 are made.

One way of carrying out the invention is to cut from a sheet of cellulose acetate or like thermoplastic transparent organic material a disc or plate of substantially the same size as the glass disc or plate to which it is to be united and to cut from the same sheet material or, if desired, from similar sheet material of a different, for instance, heavier gauge, an annulus of about the same external dimensions. This annulus is then moistened on both sides with a solvent or other assisting liquid and interposed between the glass and cellulose acetate plates. The assembly is then united under pressure, preferably at an elevated temperature. Suitable solvents where the thermoplastic material is cellulose acetate are acetone, dioxane or methylene ethylene ether. These solvents can be diluted with a latent solvent such as methanol or ethanol or with a non-solvent such as water or a liquid hydrocarbon. Instead, however, of employing a true solvent for the thermoplastic material a liquid may be employed which, while not a solvent at ordinary temperatures becomes one at elevated temperatures. For example, in connection with sheet materials of cellulose acetate, suitable liquids comprise aqueous solutions of ethanol or methanol of concentration between 60 and 90%.

The solvent or other assisting liquid may with advantage contain a plasticiser for the cellulose acetate or other thermoplastic material, for example dimethyl phthalate, dimethoxy ethyl phthalate, diethoxy ethyl phthalate, dibutyl tartrate, diethyl tartrate or triacetin may be present. Plasticisers capable of increasing the fire-resistance of the materials, especially phosphoric esters and halogenated phosphoric esters, for example tricresyl phosphate, tributyl phosphate, triphenyl phosphate, trichloroethyl phosphate and trichlorobutyl phosphate, may also be present preferably in admixture with plasticisers having a greater affinity for the thermoplastic material. It is of advantage for the disc or plate of thermoplastic material as well as for the annulus to contain plasticiser whether or not a plasticiser is contained in the assisting liquid, and the invention includes forming these components with a relatively high content of plasticiser so that union can be effected under the action of heat and pressure in the absence of an assisting liquid. In general, however, the use of such a liquid is to be preferred. When at least one of the components to be united contains a considerable proportion of plasticiser, union may, with advantage, be effected in the absence of a liquid having solvent or potential solvent properties for the thermoplastic material but in the presence of water.

The thickness of the sheet material from which the transparent disc or plate is made will depend to some extent on the purpose which the transparent member is to serve. Thus in a respirator eye-piece for instance the sheet material may have a thickness ranging from about 0.003" to 0.004" up to 0.01" or 0.02" or may even be considerably thicker, for example 0.03" or 0.04" up to 0.08" or more. The disc or plate of glass or other relatively heat-resistant material will in general be thicker than the disc or plate of thermoplastic material. It may, for example vary in thickness from less than 0.05" to 0.10" or 0.15" or even more. The thickness of the annulus will again depend upon the conditions to which the transparent member is to be subjected. In general a thickness between 0.02" and 0.10", for example 0.05" to 0.08" is suitable.

In an exactly similar way to that described above eye-pieces can be made having both discs of cellulose acetate or having one or both discs of cellulose acetate-propionate or cellulose acetate-butyrate. The annulus may be of the same material as the disc or discs of thermoplastic material or may be of another thermoplastic material compatible with that of which the discs are made. Thus, in the case of discs of either of the mixed esters referred to above the annulus may be of the same composition or may be of cellulose acetate.

As indicated above the material employed in the construction of the disc or discs of thermoplastic material and/or of the annulus is preferably cellulose acetate. Other transparent thermoplastic organic film-forming materials may, however, be used, for example other esters, ethers or ether-esters of cellulose such as cellulose propionate, cellulose butyrate, cellulose acetate-nitrate, cellulose acetate-propionate, cellulose acetate-butyrate, ethyl cellulose, benzyl cellulose or ethyl cellulose acetate. Apart from cellulose acetate, mixed esters, such as the acetate-propionate and acetate-butyrate are among the most useful of cellulose derivatives for the purpose. Instead of cellulose derivatives thermoplastic transparent film-forming polymerised esters and ethers may be employed, for example polyvinyl chlor-acetate, co-polymers of vinyl acetate and vinyl chloride and bodies of somewhat similar constitution derived from unsaturated acids such as acrylic acid, for example polymethyl methacrylate. From the point of view of resistance to heat, however, cellulose derivatives are preferred to substances of lower melting point such as polyvinyl acetate.

Instead of glass for the disc or plate of non-thermoplastic material I may employ quartz, mica and other inorganic relatively heat-resistant transparent materials, or organic materials of similar properties such, for example as fully condensed phenol formaldehyde synthetic resins, urea formaldehyde synthetic resins and other insoluble infusible synthetic resins.

When one of the discs or plates of the transparent member is formed of an organic film-forming ester such as are referred to above the resistance to dimming by the deposition of moisture on the eye-piece or other transparent member may be still further increased by partly saponifying the ester as described, for example, in U. S. Patent No. 2,280,482 or the film-forming ester may by virtue of a relatively small acidyl content itself be resistant to fogging in a moist atmosphere. Thus, for instance, as described in U. S. Patent No. 2,280,097 a cellulose acetate may be employed which, while insoluble in water is soluble in solutions of suitable organic liquids containing a high proportion, for example 30% or more, of water. Naturally, to obtain the advantage referred to by these methods that surface of the eye-piece which is on the inside of the respirator face-piece should be saponified or composed of an ester of low acidyl content.

It is not an essential feature of the invention, however, that the space between the two sheets or discs should be filled with air. Other transparent fluids, for example inert gases, or solvent vapours may be present in this space. Means may, if desired, be provided for removing air and/or introducing a fluid into the space.

Having described my invention, what I desire to secure by Letters Patent is:

1. A respirator eye-piece or the like which comprises two transparent sheets, one of said sheets being composed of glass and the other substantially of thermoplastic organic material having a basis of an organic ester of cellulose superficially saponified on the surface furthest from the glass, said sheets being united by a flat annulus of said thermoplastic material to which both sheets are adherent along the margin of their faces.

2. A respirator eye-piece or the like which comprises two transparent sheets, one of said sheets being composed of glass and the other substantially of thermoplastic organic material having a basis of cellulose acetate superficially saponified on the surface furthest from the glass, said sheets being united by a flat annulus of said thermoplastic material to which both sheets are adherent along the margin of their faces.

3. A respirator eye-piece or the like which comprises two transparent sheets, one of said sheets being composed of glass and the other substantially of thermoplastic organic material having a basis of cellulose acetate propionate superficially saponified on the surface furthest from the glass, said sheets being united by a flat annulus of said thermoplastic material to which both sheets are adherent along the margin of their faces.

4. A respirator eye-piece or the like which comprises two transparent sheets, one of said sheets being composed of glass and the other substantially of thermoplastic organic material having a basis of cellulose acetate butyrate superficially saponified on the surface furthest from the glass, said sheets being united by a flat annulus of said thermoplastic material to which both sheets are adherent along the margin of their faces.

WILLIAM WALKER.